PCM NETWORK SYNCHRONIZATION

Filed Oct. 18, 1962 5 Sheets-Sheet 1

INVENTOR
J. S. MAYO
BY Leonard M. Arnold
ATTORNEY

June 9, 1964 J. S. MAYO 3,136,861
PCM NETWORK SYNCHRONIZATION
Filed Oct. 18, 1962 5 Sheets-Sheet 2

INVENTOR
J. S. MAYO
BY Leonard M. Arnold
ATTORNEY

INVENTOR
J. S. MAYO
BY Leonard M. Arnold
ATTORNEY

INVENTOR
J. S. MAYO
BY Leonard M. Arnold
ATTORNEY

June 9, 1964

J. S. MAYO 3,136,861

PCM NETWORK SYNCHRONIZATION

Filed Oct. 18, 1962

5 Sheets-Sheet 5

INVENTOR
J. S. MAYO
BY Leonard M. Arnold
ATTORNEY

United States Patent Office 3,136,861

Patented June 9, 1964

3,136,861

PCM NETWORK SYNCHRONIZATION

John S. Mayo, Berkeley Heights, N.J., assignor to Bell Telephone Laboratories, Incorporated, New York, N.Y., a corporation of New York Filed Oct. 18, 1962, Ser. No. 231,511
8 Claims. (Cl. 179—15)

This invention relates to multiplex communication and more particularly to time division pulse multiplexing systems in which the various transmitters whose pulse signals are to be multiplexed are not synchronized.

In contemplating a pulse communication network of continental scope, pulse signals of relatively low pulse repetition frequency or speed will be interleaved or time division multiplexed with other such signals to form a high speed pulse signal for transmission on a common facility such as a transcontinental waveguide. The process of interleaving, or time division multiplexing, low speed signals into a high speed signal requires almost exact synchronization of the low speed signals. Otherwise, pulses will be lost in one or more of the slower pulse repetition frequency signals or pulses inadvertently added to the pulse signals of higher pulse repetition frequency. In either situation framing synchronization will be lost which has the effect of opening the circuit until framing is restored. When this happens information is lost.

The use of a common clock signal transmitted to all parts of the system for synchronization purposes has been proposed as a solution to the problem but this proposal appears undesirable for several reasons. First, such a system would require expensive clock signal transmission facilities. Second, synchronization at the highest pulse rates requiring the greatest accuracy of timing is almost impossible due to variations in the parameters of the transmission facilities employed. For example, local variations in the transmission characteristics of such facilities due to temperature, humidity and other local effects, would cause changes in the effective pulse rate at the end of the line even though the input pulse rate was constant.

Because of the desirability of being able to multiplex low speed pulse signals on a high speed long distance transmission facility using time division techniques much effort has been expended in attempts to overcome the above problems. One of the most desirable techniques is that disclosed in United States Patent 3,042,751, issued to R. S. Graham on July 3, 1962. In accordance with that invention a plurality of asynchronous pulse trains derived from non-synchronized transmitters are retimed by a common clock source of slightly higher repetition rate than the highest pulse rate to be synchronized. To accomplish this end a variable delay is included in the path of each pulse train and the delay continuously reduced at a rate sufficient to maintain synchronism with the clock source. Because the clock source is of a higher pulse repetition rate than any of the asynchronous pulse trains the reduction in delay eventually becomes a full pulse period; and at this time an extra pulse is inserted in the pulse train to bring its repetition rate up to that of the clock source. Simultaneously, the full delay is re-introduced in the pulse path. In addition, information concerning the value of the delay in each of the pulse paths must be encoded and transmitted so that it may be used at the receivers to restore the original timing and delete the extraneous pulses. Because of the necessity for encoding and transmitting this latter information and later decoding it, a pulse transmission system employing the technique disclosed in the above-mentioned patent devotes a relatively large amount of its cost and complexity to this function. In addition, a separate channel must be employed to transmit this information and as a result message carrying capacity is reduced.

A pulse transmission system employing the above technique is also relatively sensitive to transmission errors in the transmission path which contains the information concerning the value of the delay in each of the pulse paths. For example, a relatively short burst of noise would be sufficient to render the entire transmission system out of frame which has the effect of opening the entire circuit until framing is restored. As a result many frames of information are lost.

It is an object of the present invention to eliminate the necessity for generating and transmitting relatively complex information in order to synchronously combine or otherwise synchronously operate upon a plurality of asynchronous pulse trains.

It is a related object of the present invention to reduce the complexity of equipment which synchronously combines or otherwise operates upon asynchronous pulse trains.

It is a further object of the present invention to reduce the susceptibility of such transmission systems to loss of synchronization due to transmission errors.

In one embodiment of the present invention each pulse signal to be multiplexed has its pulse repetition rate raised to a common repetition frequency by the insertion of control signals into the pulse signal, and after multiplexing, transmitting, demultiplexing, and receiving the transmitted signals predictive techniques are employed to remove the inserted control signals even in the presence of large transmission error rates The predictive techniques determine when a control signal should have occurred in the transmitted signal, and when a control signal is lost due to transmission error this determination is used to minimize the loss of information due to framing error. As a result the equipment is relatively insensitive to transmission errors, and short bursts of noise are not sufficient to render the entire transmission system out of frame as is the case with the techniques employed in the prior art. In addition, because of the composition of the waveforms of higher frequency and the predictive techniques employed there is no necessity for transmitting additional information regarding the composition of the signals of higher frequency. This increases the channel space available for the transmission of message signals, and reduces the cost and complexity of the equipment.

The invention may be more fully comprehended from the following detailed description taken in conjunction with the drawings in which.

Figure 1:
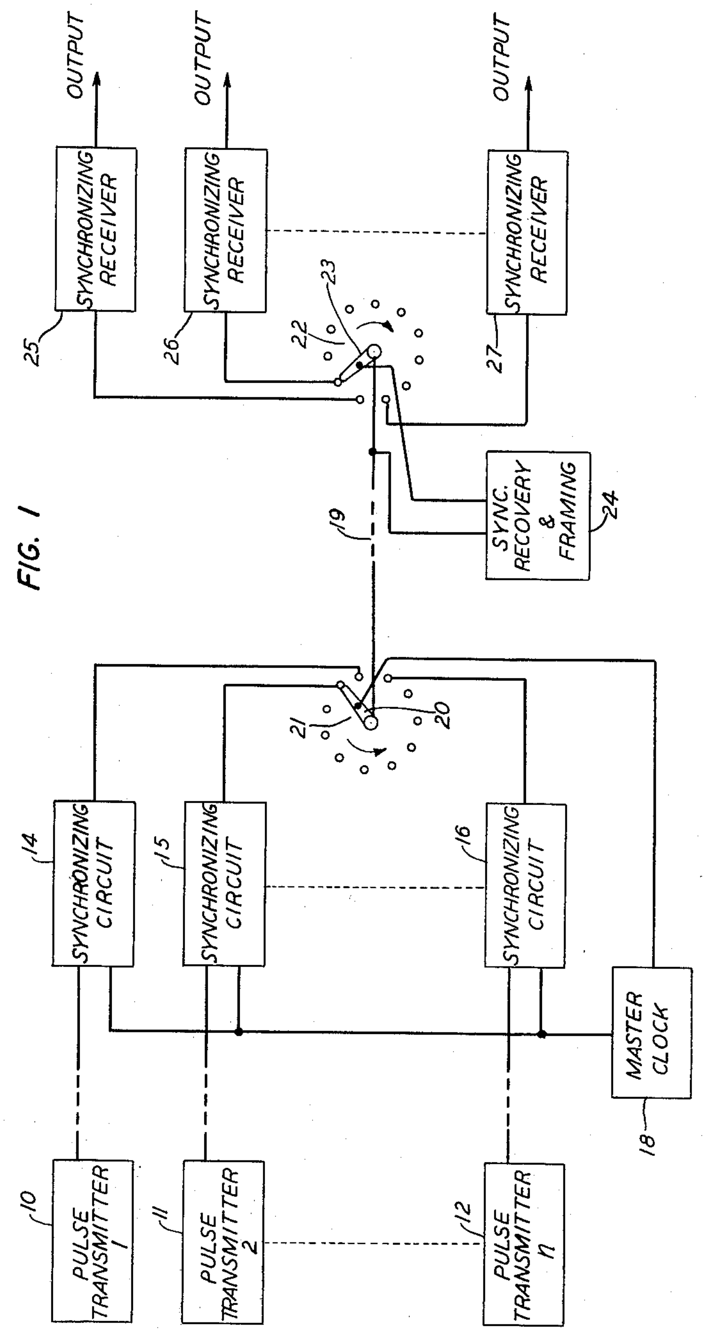
FIG. 1 is a block diagram of a pulse multiplexing system in accordance with the present invention.

A time division multiplex system in accordance with the present invention is shown in block diagram form in FIG. 1. Pulse signals from a plurality of pulse transmitters 10, 11, . . . , 12, which may be at geographically distant locations, are retimed by the insertion of control signals to a higher common pulse repetition frequency by centrally located synchronizing circuits 14, 15, . . . , 16 which are controlled by a master clock source 18. The multiplexed signals are to be transmitted over a transmission facility 19, illustrated schematically as a line, which may in fact be a microwave waveguide or other high speed high capacity system. To facilitate multiplexing the total time available on transmission facility 19 is divided into a sequence of discrete time intervals or time slots by means of commutator 21 which as *n* segments where *n* is the number of pulse transmiters to be served. The retimed pulse signals from each synchronizing circuit 14, 15, . . . , 16 are assigned to a unique channel on transmission facility 19 by the connection of each synchronizing circuit to one of the segments of commutator 21 whose brush 20 is driven by a signal from the master clock source 18. As a result the retimed pulse signals are sequentially applied to the transmission facility 19. At the distant end of the transmission facility the multiplexed signals are separated by the action of commutator 22 whose *n* segments are sequentially contacted by brush 23. The brush 23 is controlled by a synchronization recovery and framing circuit 24 which recovers the basic pulse repetition rate of the transmitted signals and frames the transmitted signal pulse so that brushes 20 and 23 are continuously in phase. The commutators 21 and 22 may in fact be electronic commutators of any type known in the art and the synchronization recovery and framing circuit 24 may be that disclosed in United States Patent 2,527,650, issued to E. Peterson on October 31, 1950.

Each segment of commutator 22 is connected to a synchronizing receiver 25, 26, . . . , 27 at which the control signals are removed so that the output of each synchronizing receiver 25, 26, . . . , 27 is identical to the output of each pulse transmitter 10, 11, . . . , 12, respectively, and possesses the original timing of those signals.

From the general description of the embodiment of the invention shown in FIG. 1 the following advantages of this circuit initially appear. First, each channel of transmission facility 19 is devoted to the transmission of retimed message signals with no channel devoted exclusively to the transmission of information regarding the retiming process. As a result, the need for retiming signal encoders and decoders as required by the prior art is eliminated. Other advantages of this invention will appear as a result of an understanding of the detailed description of the synchronizing circuit and synchronizing receiver circuitry to be presented below and it will suffice for the present to merely mention that an embodiment of this invention is less susceptible to noise and transmission error than the systems of the prior art.

Figures 4A, 4B, 5:
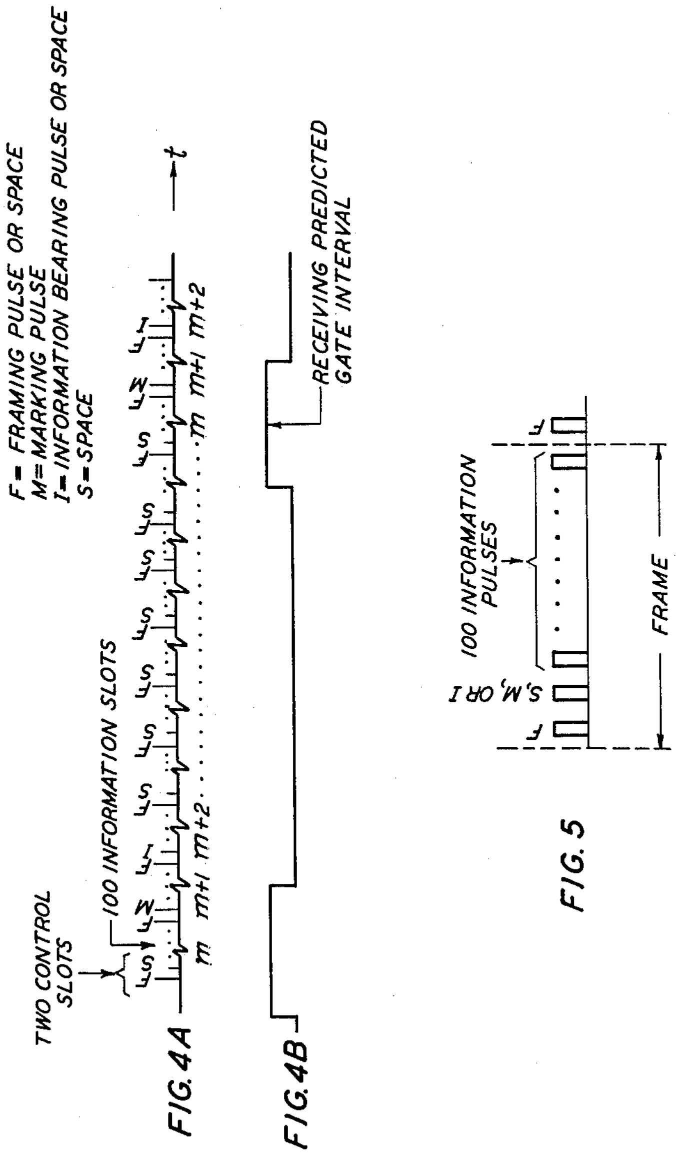
FIG. 4A is an illustration of twelve frames of the translated higher frequency signal.
FIG. 4B is a waveform of the receiving predicted gate interval signal used to predict the occurrence of control pulses.
FIG. 5 is an expanded illustration of a single frame of the translated signal.

In the embodiment of the invention shown in FIG. 1 a plurality of asynchronous pulse signals, derived from a corresponding plurality of geographically separated nonsynchronized pulse transmitters, are retimed by a master clock source of slightly higher repetition rate than the highest pulse rate to be synchronized by the insertion of control signals into the asynchronous pulse trains. Each frame, which is shown in FIG. 5, of the resulting translated signal comprises a block of *n* successive time slots where the first time slot always contains a framing pulse or space while the second time slot is a so-called variable time slot; that is, it may contain either information pulses from the asynchronous pulse signal or control signals. When a pulse (called a marker pulse) is present in a variable time slot it indicates that there will be information in the variable time slot in the next succeeding frame while a space in a variable time slot indicates that there will be no information in the variable time slot of the next frame. The control pulses in the form of framing pulses and spaces and marker pulses and spaces are removed at the receiver and all information is detected and reproduced at the original pulse repetition frequencies.

Figure 2:
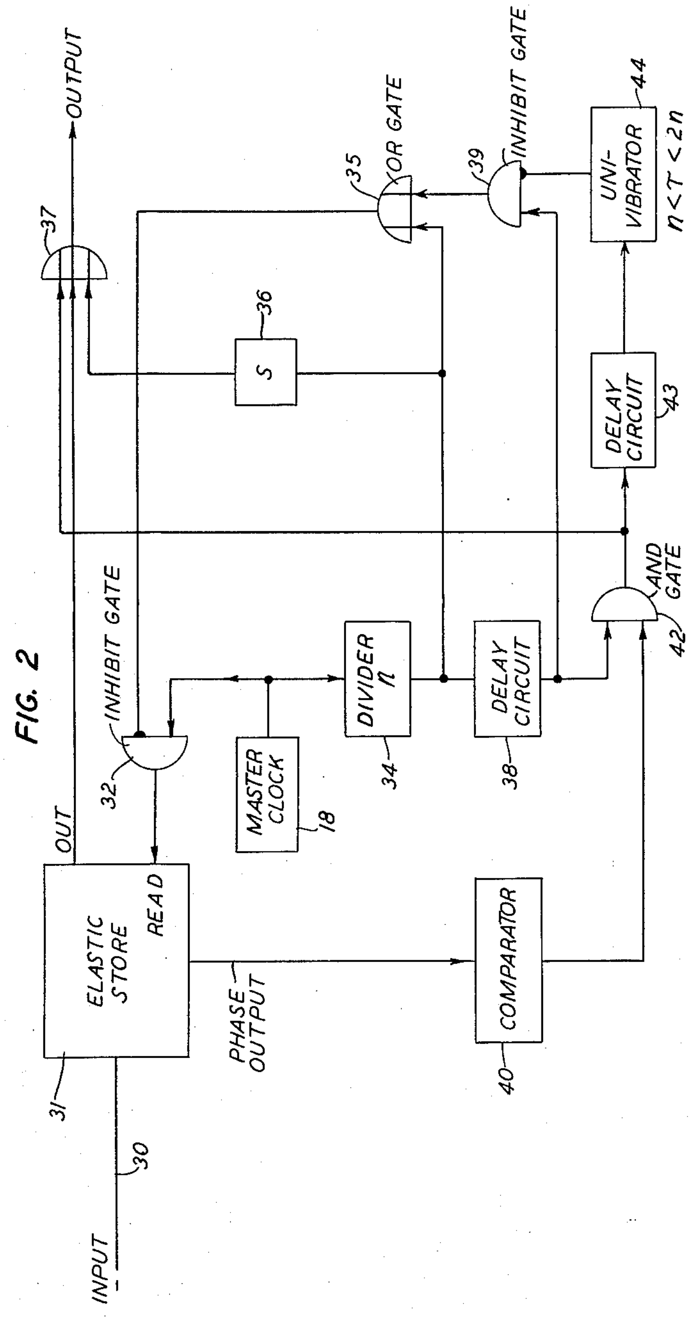
FIG. 2 is a schematic block diagram of each of the synchronizing circuits shown in FIG. 1.

A synchronizing circuit 14, 15, . . . , 16 for translating the asynchronous pulse trains to pulses of higher pulse repetition frequency is shown in FIG. 2. The input signal from each pulse transmitter 10, 11, . . . , 12 is applied to the input terminal 30 of a synchronizing circuit. The terminal 30 is connected to the input of an elastic store 31 such as that disclosed by M. Karnaugh in copending United States application Serial No. 32,793, filed May 31, 1960, now Patent No. 3,093,815. In such a store the input pulses may be stored and read out at a pulse repetition rate which is different from the rate at which it was stored. In addition, this store provides an output voltage which is a measure of the difference in phase between the input and output signals. In the above-mentioned copending application the data are read out of the store under the control of an oscillator which is in turn controlled by the phase output voltage. In its present use this control circuit is eliminated and the read-out governed under the control of external circuitry to be described below.

The translated signals are constructed in the following manner. The output pulses from the master clock source 18 are applied to the read terminal of store 31 by means of inhibit gate 32. The read terminal of store 31 is connected to the stepping switch in the store which controls the read-out of the data so that data are read out at the higher pulse repetition frequency of transmission facility 19 as determined by master clock source 18. After every $n^{th}$ pulse from the master clock source 18 the divider circuit 34 generates a pulse which is applied through OR circuit 35 to inhibit gate 32 during that time slot. The output of the divider is also applied to a suitable pulse shaping circuit 36 where its statistics are suitably altered so that the framing pulses may be recognized at the receiver. One technique for accomplishing this latter result is to transmit alternate pulses and spaces and this may be done by employing the circuitry disclosed in United States Patent 2,984,706, issued to H. M. Jamison et al. on May 16, 1961. The framing pulse output of the shaper 36 is applied to the output terminal of the synchronizing circuit by means of OR gate 37. The pulse output of divider circuit 34 is also delayed one time slot by means or delay circuit 38 and applied through inhibit gate 39 and OR gate 35 to inhibit the read-out of data from the elastic store 31 during the time slot succeeding the framing pulse. This time slot is the variable time slot. Thus a framing pulse is generated at the output terminal each $n^{th}$ time slot and a variable time slot, which normally has a space in it, is created in each time slot immediately succeeding the framing pulse time slot. During these time slots data are not normally read out of store 31.

The pulse repetition frequencies of the master clock source 18 and the pulse transmitters 10, 11, . . . , 12 are so close, as described below, that after a predetermined number of frames of the output signal pulses, an additional time slot of data from the pulse transmitter has accumulated in the store. This condition is indicated by the phase output voltage of the store reaching a predetermined voltage which is sensed by comparator 40. The output of comparator 40 is applied to one input terminal of AND gate 42 and in combination with the output of delay circuit 38, occurring at the beginning of each variable time slot, serves to produce an output signal from AND gate 42 at the beginning of the variable time slot whenever the elastic store has accumulated an additional time slot of data. The pulse output of AND gate 42 is the marker pulse mentioned above and is applied to OR gate 37 and appears at the output terminal in the variable time slot of one frame to indicate that information will be present in the variable time slot of the next frame. The marker pulse is also delayed one time slot by delay circuit 43 and applied to a univibrator or one shot multivibrator 44 whose period, T, is greater than one frame of *n* successive pulses but less than two frames of successive pulses. The output of the univibrator 44 is present during the variable time slot of the frame following the frame in which the marker pulse was applied to the output terminal and this output signal inhibits inhibit gate 39. As a result the output of delay circuit 38 is rendered incapable of inhibiting gate 32 and information is read from the store during the variable time slot of the frame succeeding the frame in which a marker pulse was transmitted.

Thus, in this embodiment of this invention, a pulse signal of a first frequency is translated into an independent and slightly higher frequency by the insertion of control signals which comprise framing information followed by a so-called variable time slot which may contain either control signals or information. Most of the time the variable time slot carries no pulse at all, but occasionally and periodically a marker pulse is transmitted in the variable slot, signifying that in the next frame the variable time slot will carry information. FIG. 4 illustrates the resulting pulse train where the frame comprises, for example, 102 time slots. Generally a frame consists of a framing pulse or space in the first time slot, a space in the variable time slot, and 100 succeeding time slots containing pulse information. Occasionally a frame comprises a framing pulse or space in the first time slot, a marker pulse in the second or variable time lot and 100 succeeding information time slots. When a pulse is present in the variable time slot in one frame it indicates that information will be present in the variable time slot of the immediately succeeding frame. An expanded drawing of this resulting translated signal is shown in FIG. 5, with the above discussed possible situations for the variable time slot indicated by S, M, or I, where S means a space, M means a marker pulse and I means information. At the receiver, using predictive techniques to be discussed below, the translated signals as demultiplexed by commutator 22 are converted back to the original pulse signals as they appeared at the output of the pulse transmitters 10, 11, . . . , 12. Because, in accordance with this invention, predictive techniques are used there is no necessity for redundantly coding control information, transmitting it, decoding it, and using it to obtain the original pulse trains.

Figure 3:
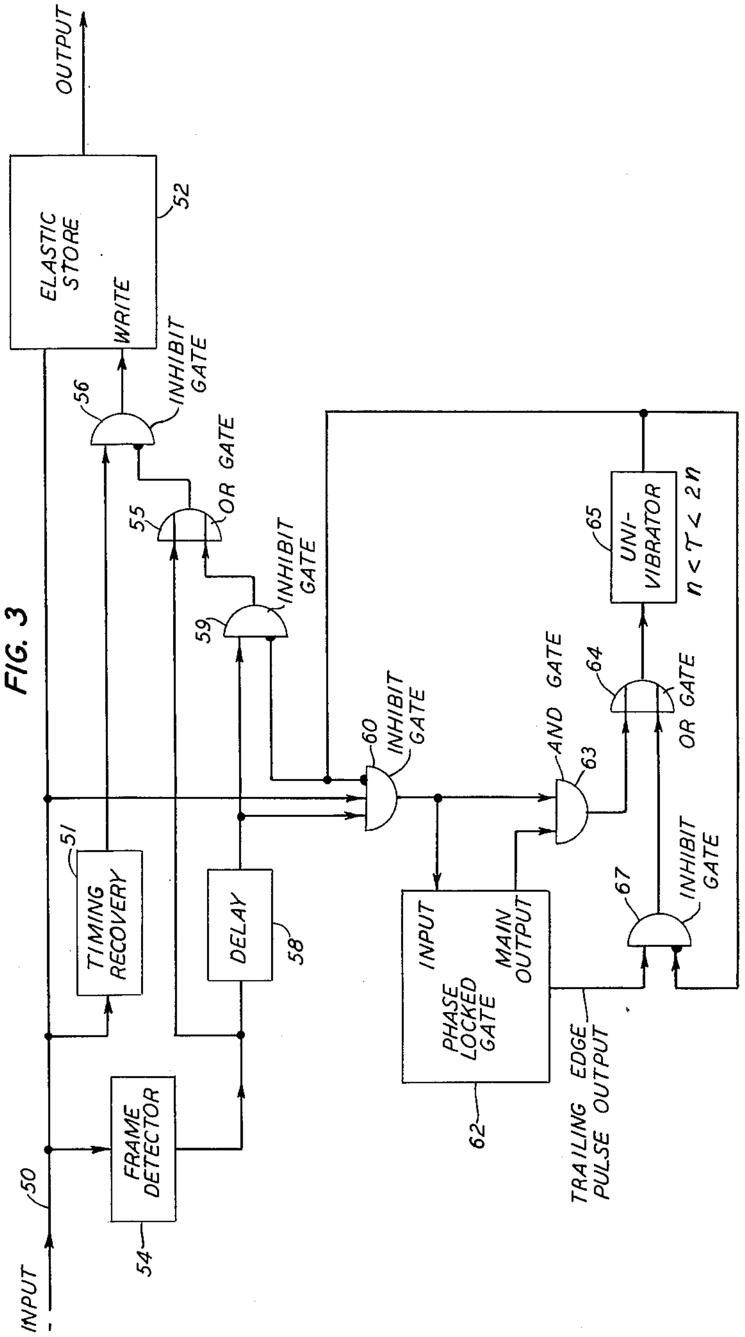
FIG. 3 is a schematic block diagram of each of the synchronizing receivers shown in FIG. 1.

A timing recovery circuit in accordance with one embodiment of this invention is shown in FIG. 3. Each incoming signal demultiplexed by commutator 22 from the high speed high capacity transmission facility 19 is applied to the input terminal 50 of a synchronizing receiver. The input terminal 50 is in turn connected to the input terminal of a timing recovery circuit 51 which is actually part of an elastic store 52 disclosed in the above-mentioned copending application, Serial No. 32,793, assigned to the present assignee. The timing recovery circuit 51 extracts the timing of the incoming signal and the output of the recovery circuit is used to control the writing of the data signal at terminal 50 into an elastic store. A frame detector 54 such as that described in United States Patent 2,953,694, issued to R. L. Wilson on September 20, 1960, produces an output pulse in response to the receipt of each transmitted framing pulse or space. The output signal from frame detector 54 is applied through OR gate 55 to inhibit the output of inhibit gate 56 during the framing pulse interval so that no datum is written into the elastic store 52 at that time. The framing pulse output of detector 54 is also applied to a delay circuit 58 which delays the framing pulse for one time slot. The output terminal of delay circuit 58 is connected to inhibit gate 59 whose output is applied through OR gate 55 to inhibit the inhibit gate 56 during the variable time slot. Thus in the usual sequence of events inhibit gate 56 placed between the timing extraction circuit 51 of the store 52 and the store itself serves to prevent writing information into the store 52 during both the framing interval and the variable time slot.

When a marker pulse follows a framing pulse, to indicate that information will be contained in the variable time slot of the next succeeding frame, the marker pulse appearing at terminal 50 and the delayed framing pulse from delay circuit 58 combine to actuate gate 60. The resulting output of inhibit gate 60 is used to control a so-called phase locked gate 62, to be described in detail below, whose output is a gate signal centered in time about the marker puse and occupying a time interval of two frames. The gate signal, shown in FIG. 4B, appears at the main output terminal of the gate 62 and together with the marker pulse actuates AND gate 63 whose ouput in turn passes through OR gate 64 and triggers a monostable multivibrator or univibrator 65 whose pulse period T is less than two frames but more than one frame. The output of the univibrator 65 inhibits gate 59 which prevents the output signal from delay circuit 58 from preventing the writing of datum into the store 52 during the variable time slot of the next succeeding frame. In addition, the output of univibrator circuit 65 is used to inhibit inhibit gate 60 so that the presence of a datum pulse in the variable time slot of the next frame does not serve to produce an output pulse from gate 60 and falsely trigger univibrator 65 as though a marker pulse were received. Thus, in accordance with this invention, the data are written into the store 52 and the control pulses in the form of framing signals and marker pulses and spaces in the variable time slot are not written into the store so that the resulting data in the store are that which originally appeared at the outputs of transmitters 10, 11, . . . 12.

Figure 6:
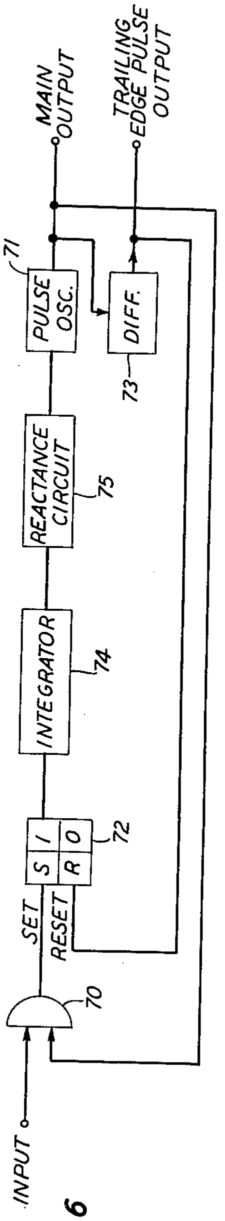
FIG. 6 is a schematic block diagram of the phase locked gate shown in FIG. 3.

The phase locked gate 62 is shown in block diagram form in FIG. 6. Input pulses from inhibit gate 60 are applied to the one input terminal of an AND gate 70 whose second input terminal is connected to the output of a pulse oscillator 71 such as that disclosed by J. A. Narud on page 73 of the 1960 International Solid State Circuits Conference Digest of Technical Papers, published by Lewis Winner, New York 36, New York. When the output pulse of the pulse oscillator 71 and an input pulse from inhibit gate 60 coincide in time the AND gate 70 produces an output pulse which actuates a bistable circuit 72 to produce a positive going output voltage at the output terminal of the bistable circuit. The pulse output of the pulse oscillator 71 is differentiated by differentiator circuit 73 which produces a negative going output voltage upon the termination of the pulse output from the pulse oscillator 71 to reset the bistable circuit. The output voltage from the bistable circuit 72 is integrated by an integrator circuit 74 and the output of the integrator circuit is in turn applied to a reactance circuit 75 which varies the tuned circuit capacitance of the oscillator 71 and thereby varies the frequency of oscillation of the oscillator.

Figure 7:
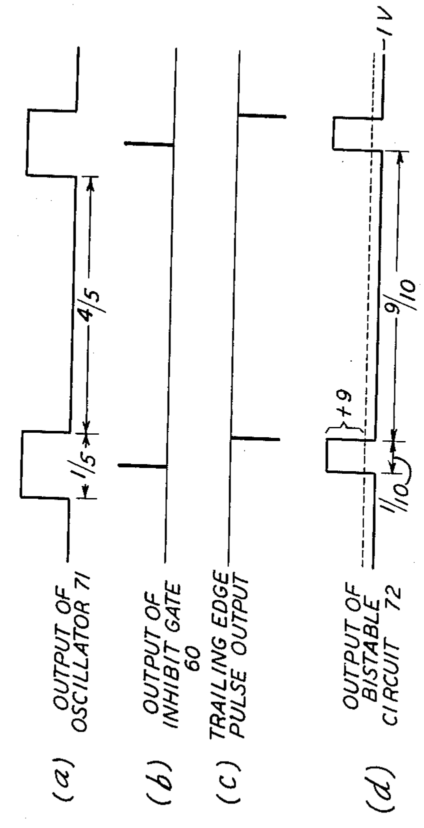
FIG. 7 is a group of waveforms illustrating the signals at various points in the phase locked gate shown in FIG. 6.

The pulse output of the oscillator 71 occupies, in this embodiment of the invention, 20 percent of the period of oscillation of oscillator 71 as illustrtaed in line *a* of FIG. 7. The output of inhibit gate 60 is shown in line *b* of FIG. 7 when the oscillator 71 output pulse is centered in time around the marker pulses. The trailing edge pulse output of differentiator circuit 73 is shown in line *c* of FIG. 7 and the output of the bistable circuit is illustrated in line *d* of FIG. 7. As may be readily seen by reference to FIG. 7, when the pulse output of pulse oscillator 71 is centered in time around the marker pulse the output of the bistable circuit 72 consists of a short positive pulse occupying one-tenth the period of the oscillator 71 output and a negative pulse occupying nine-tenths of that period. The positive going pulse output voltage of the bistable circuit is nine times the absolute magnitude of the amplitude of the negative going pulse output voltage of the bistable circuit so that when the output pulse from oscillator 71 is centered around the marker pulse the output of the integrator circuit 74 is zero.

In the event that the output pulse is not centered around the marker pulse an error signal is developed. For example, if the output pulse occurs too late then a wider positive pulse is generated by the bistable circuit 72 and the integrator circuit 74 produces a positive output voltage. This positive output voltage is applied to the reactance circuit 75 to increase the frequency of oscillation of the oscillator so that the next output pulse occurs earlier than it would have in order to center it around the next occuring marker pulse. In the event that the output pulse occurs too soon then the positive output of the bistable circuit 72 is reduced in width and the output pulse of the integrator 74 is now a negative voltage. This negative voltage is applied to the reactance network to reduce the frequency of oscillation of the oscillator so that the next occurring output pulse occurs later in time than it would have and is centered in time around the next marker pulse.

As may be seen by reference to FIG. 4A, where $n=102$, i.e., there are 102 time slots in a frame, a frame generally consists of two control time slots and 100 information time slots, but occasionally a frame contains 101 information time slots and one control time slot. The frame of 101 information slots is always preceded by a frame wherein the second control time slot contains a marker pulse in the variable time slot. The pulse repetition rate to which the incoming signals are translated is such that a marker pulse occurs in every $m^{th}$ or $m+1^{th}$ frame. Where $n=102$ and $m=9$, for example, then the occurrence of the marker pulse is in every $9^{th}$ or $10^{th}$ frame, since the elastic store gains a time slot every $9^{th}$ or $10^{th}$ frame depending on the manner in which the instantaneous frequencies of the transmitters 10, 11, . . . , or 12 vary compared with the manner in which the instantaneous pulse repetition frequency of the transmission facility 19 varies.

Where, for example, $n=102$ and $m=9$ then the marker pulse oscillates between every $9^{th}$ and every $10^{th}$ frame, dwelling at each position a fraction of the time commensurate with the instantaneous frequencies. To permit such prediction of the position of the marker pulses a frequency variation in the pulse rates of both the transmission facility 19 and transmitters 10, 11, . . . , 12 of fifty parts per million is permissible.

Since the marker pulse must occur in the $m^{th}$ or $m+1^{th}$ frame then its occurrence may be predicted. In the event it is lost in transmission it may be assumed to have occurred, and a control pulse may be dropped. The resulting error is relatively small, and the equipment is not driven out of synchronization.

To predict the occurrence of a marker pulse and actuate the receiver in the proper manner in the event the marker pulse is lost the phase locked gate 62 is provided. The gate, as described above, generates a gate signal centered, in time, around each possible marker pulse position since the marker pulse oscillates between these positions and the gate will therefore tend to center the gate interval around these positions. The duration of the gate is, for example, two frames. In the event a marker pulse does, due to transmission error, not occur, within the gate interval, then it is deemed to be lost in transmission and the circuitry considers the marker pulse to have occurred at the end of the gate interval. At the end of the gate interval the gate circuit 62 generates an output pulse which passes through inhibit gate 67 and OR gate 64 to trigger the univibrator 65 to permit writing into the store 52 during the next variable time slot. Thus, if a marker pulse is lost in the $m^{th}$ time slot due to error in transmission, digital errors are made and a frame of errors in the next succeeding frame is made. If a marker pulse is lost during the $m+1^{th}$ time slot, however, no errors are made since the end of the gate interval occurs before the next frame.

The predicted gate interval is shown in FIG. 4B in time relationship with the line signal shown in FIG. 4A. The first two frames of the signal shown in FIG. 4A are the $m^{th}$ and $m+1^{th}$ frames and the marker pulses may be in either frame. Note that the gate interval is centered in time around the possible marker pulse positions. If the marker pulse occurred in the $m^{th}$ frame but was lost then the information in the variable time slot of the $m+1^{th}$ frame will be lost and that frame will contain a frame of errors. The end of the gate interval during the $m+1^{th}$ frame, however, will write another time slot into the store during the variable time slot of the next frame and so the total error is limited to a single frame. If, however, the marker pulse were lost from the $m+1^{th}$ frame then no errors would be made since its occurrence would be predicted. These possible errors are much less than those encountered in the prior art and despite this fact the circuitry is also less complex, less expensive, and provides more usable message space.

It should be recognized that where it is desired to increase the range of possible variation of the pulse repetition rates of the transmission facility 19 and the pulse transmitters 10, 11, . . . 12, then the marker pulse will oscillate through a greater number of possible pulse positions and the width of the gate interval will have to be increased in order to encompass these positions. As a result, of course, the number of errors committed in the event of a loss of a marker pulse from one of the first possible pulse positions results in an error which is greater than that described.

While the retiming arrangements of the present invention have been described with reference to a multiplex transmission system it is to be understood that these arrangements are only illustrative of numerous and varied other arrangements which could represent applications of the principles of the invention. Any system in which one or more pulse trains are to be retimed to a selected time base would present an opportunity for application of this invention and such other arrangements may readily be devised by those skilled in the art without departing from the spirit and scope of the invention.

What is claimed is:

1. A time division transmission system for a plurality of asynchronous pulse trains comprising means for converting the pulse repetition rate of each of said pulse trains to a common higher pulse repetition rate by the insertion of control pulses and spaces into each pulse train, means for multiplexing said converted pulse trains on a common time-divided transmission facility, means for demultiplexing said transmitted signal, and means including prediction means for removing said control pulses and spaces from said higher pulse repetition rate pulse trains.

2. The time division transmission system in accordance with claim 1 including a source of clock pulses having a repetition rate higher than that of any of said asynchronous pulse trains, said higher common pulse repetition frequency being supplied by said clock pulses.

3. A time division transmission system in accordance with claim 2 wherein each of said converting means comprises, in combination, an elastic store to which one of said asynchronous pulse trains is applied, means to intermittently read data out of said store at a rate governed by said clock source and apply it to an output terminal, and means to generate said control pulses and spaces at said output terminal in the intervals of time when data is not being applied to said output terminal.

4. A time division transmission system in accordance with claim 2 wherein each of said means for removing said control pulses and spaces comprises means to ascertain the intervals of time during which a control pulse or space is present, means to predict the occurrence of a control pulse in the event it is lost in transmission, and an elastic store into which the demultiplexed pulse signals are written except during said ascertained intervals of time during which a control pulse or space is present or in which it is predicted, whereby the pulse train output of said elastic store corresponds to said asynchronous pulse trains.

5. A time division transmission system for a plurality of asynchronous pulse trains comprising means for converting the pulse repetition rate of each of said pulse trains to a higher pulse repetition rate by the insertion of control pulses and spaces into each pulse train so that each frame of the resulting pulse train consists of a framing signal in the first time slot, a control signal or an information signal in the second time slot, and information pulses and spaces from said asynchronous pulse train in the remaining time slots of said frame, means for multiplexing said converted pulse trains on a common time-divided transmission facility, means for demultiplexing said transmitted signals, and means including prediction means for removing said framing signals and control pulses and spaces from said higher pulse repetition rate pulse trains.

6. The time division transmission system in accordance with claim 5 including a source of clock pulses having a repetition rate higher than that of any of said asynchronous pulse trains, said higher common pulse repetition frequency being supplied by said clock pulses.

7. A time division transmission system in accordance with claim 6 wherein each of said frequency converting means comprises, in combination, an elastic store, means for applying one of said asynchronous pulse trains to the input terminal of said store, means responsive to said source of clock pulses to read the data out of said store at an output terminal, means responsive to said source of clock pulses to generate a framing signal at the output terminal during the first time slot of said frame and prevent the read-out of signals from said store at that time, means to generate a control pulse in the second time slot of said frame when the signals stored in said store exceed a predetermined quantum, means to generate a space in said second time slot of said frame when the signals stored in said store are less than said predetermined quantum, means to prevent the read-out of signals from said store when a space or a control pulse is generated in said second time slot, and means to read signals out of said store one frame after said control pulse is generated.

8. A time division transmission system in accordance with claim 6 wherein each of said means for removing said framing signals and control pulses and spaces comprises, in combination, an elastic store to which said transmitted signal is applied, said store having a control terminal to which an applied signal permits the writing into said store of said transmitted signal, timing means to detect each time slot of said transmitted signal connected to said control terminal of said store to permit the writing of said transmitted signal into said store during each time slot of said transmitted signal, means to detect each framing signal of said transmitted signal and inhibit said ouptut signal of said timing means during a framing signal, means to detect a space in the second time slot of said frame and inhibit said output signal of said timing means during the presence of a space in said second time slot, means to detect a control pulse in the second time slot of said frame and inhibit said output of said timing means during the presence of a control pulse and to permit the application of the output of said timing means to be applied to said control terminal of said store during the second time slot of said frame immediately following the frame in which said control pulse is present, phase locked gate means to generate an output signal at the end of a predetermined interval of time to indicate that a marker pulse has been lost in transmission and to permit the application of the output of said timing means to be applied to said control terminal of said store during the second time slot of said frame immediately following the frame in which said phase locked gate generates said output signal.

References Cited in the file of this patent

UNITED STATES PATENTS 3,042,751 Graham ---------------- July 3, 1962